H. L. RICE.
PRINTER'S GAGE.
APPLICATION FILED DEC. 9, 1918.

1,333,576.

Patented Mar. 9, 1920.

INVENTOR.
HENRY L. RICE
BY
Hazard & Miller
ATTORNEYS.

UNITED STATES PATENT OFFICE.

HENRY L. RICE, OF REDLANDS, CALIFORNIA.

PRINTER'S GAGE.

1,333,576.　　　　Specification of Letters Patent.　　Patented Mar. 9, 1920.

Application filed December 9, 1918. Serial No. 265,912.

*To all whom it may concern:*

Be it known that I, HENRY L. RICE, a citizen of the United States, residing at Redlands, in the county of San Bernardino and State of California, have invented new and useful Improvements in Printers' Gages, of which the following is a specification.

My object is to make a printer's gage, and my invention consists of the novel features herein shown, described and claimed.

Specifically, my object is to make a gage to be used by a pressman in setting the tympan gages, so that the printed matter will be square on a sheet, and so that the margins will be proportioned as desired.

Figure 1:
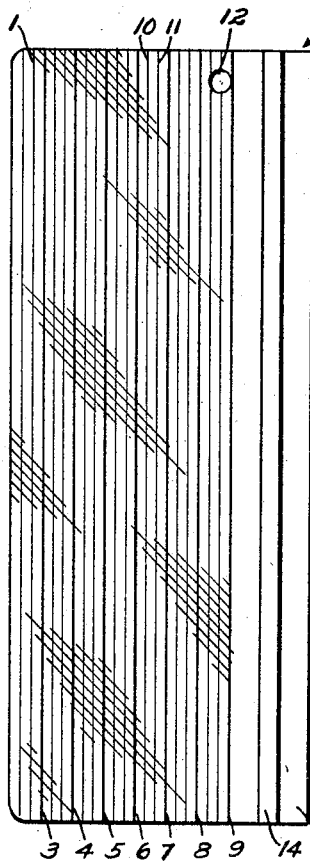
Figure 1 is a plan view of a printer's gage embodying the principles of my invention, the gage blade being celluloid.
Figure 2:
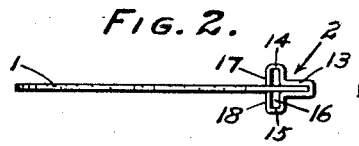
Fig. 2 is an end view of the gage shown in Fig. 1.

Referring to the drawings in detail, the printer's gage shown in Figs. 1 and 2 consists of a sheet 1 of transparent celluloid and a back 2 of metal. The sheet 1 is rectangular in plan and is longitudinally marked with heavy lines 3, 4, 5, 6, 7, 8 and 9, and the spaces between the heavy lines are marked by light lines, there being preferably two light lines 10 and 11 in each space. An opening 12 is formed through the blade near one corner, so that the gage may be hung on a nail, or the like.

The back 2 comprises a central return bend portion 13 and the upper and lower return bend portions 14 and 15 forming a T-shaped chamber 16. One edge of the gage blade sheet 1 is inserted between the return bends 14 and 15 into the return bend 13, and the return bend 13 is pinched tightly upon the sheet. The faces 17 and 18 of the return bends 14 and 15 form straight edges parallel with the lines upon the sheet 1. The projecting portion of the sheet 1 forms the gage blade.

In the use of the gage, thus constructed, the pressman will place the job upon the press set the tympan gages as well as he can to properly locate the print upon the sheet; then he will place the sheet upon the tympan against the gages and take an impression; then he will use the gage by placing the gage in place with the edge of the paper against one of the straight edges 17 or 18, and the print will show through the gage blade along the lines upon the blade, and if the lines of print are parallel with the lines upon the gage blade and the margins are of the desired relative proportions, then the tympan gages are properly set, and if this is not the case, the tympan gages will be adjusted until the desired result is obtained.

Figure 3:
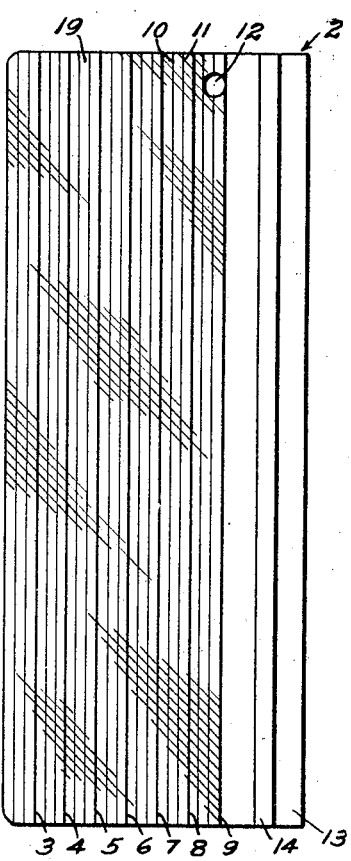
Fig. 3 is a view analogous to Fig. 1 and showing the gage blade of glass.
Figure 4:
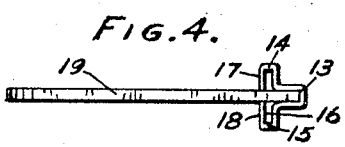
Fig. 4 is an end view of the gage shown in Fig. 3.
Figure 5:
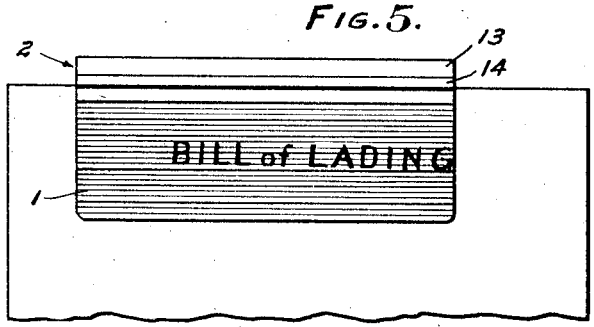
Fig. 5 is a plan showing the gage upon a piece of printed paper and illustrating its use.

In the modification shown in Figs. 3 and 4, a plate 19 of transparent glass is substituted for the plate 1 of celluloid, and the heavy lines 3 to 9, and the light lines 10 and 11, and the perforation 12 are formed upon the glass. The lines upon the celluloid or the lines upon the glass may be formed by scratching or in any other suitable way.

Thus I have produced a printer's gage for the use of a pressman in setting his tympan gages and squaring the sheets to be printed relative to the form, said printer's gage comprising a straight edge, a translucent blade extending from the straight edge and having lines parallel with the straight edge. The essential feature is the straight edge, the lines parallel with the straight edge, and the visibility of the print under or adjacent to the lines.

Various changes may be made without departing from the spirit of my invention as claimed.

I claim:

1. A printer's gage comprising a blade of transparent material having longitudinally extending parallel lines, a metallic back comprising a central return bend portion, and upper and lower return bend portions forming a T-shaped chamber, the blade being inserted into the chamber.

2. A printer's gage comprising a rectangular sheet of transparent material having longitudinally extending heavy parallel lines and light lines between the heavy lines, a metallic back comprising a central return bend portion, and upper and lower return bend portions forming a T-shaped chamber, the edge of the blade being inserted between the upper and lower return bends and into the central return bend, and the upper and lower return bends forming straight edges parallel with the lines.

In testimony whereof I have signed my name to this specification.

H. L. RICE.